Figure 1:
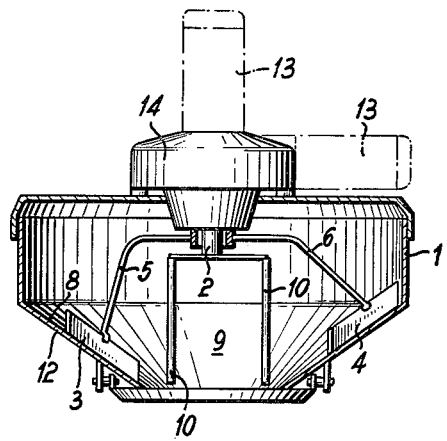

Nov. 2, 1965     M. KINDLER     3,215,412

MIXING MACHINE

Filed July 29, 1964     5 Sheets-Sheet 1

INVENTOR:
Manfred KINDLER

BY Robert H. Jacob.

AGT.

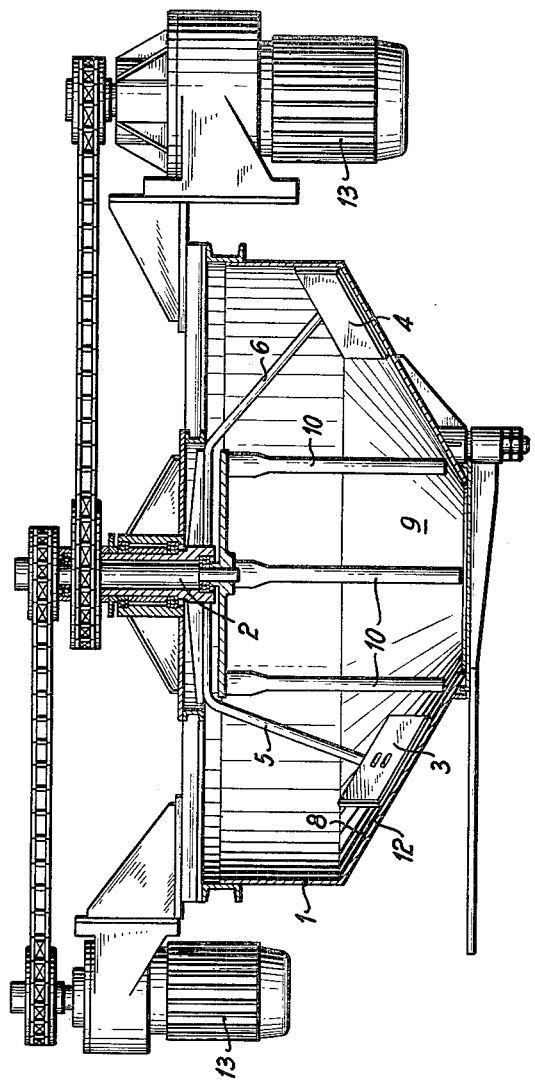

INVENTOR:
Manfred KINDLER

BY Robert H. Jacob
AGT.

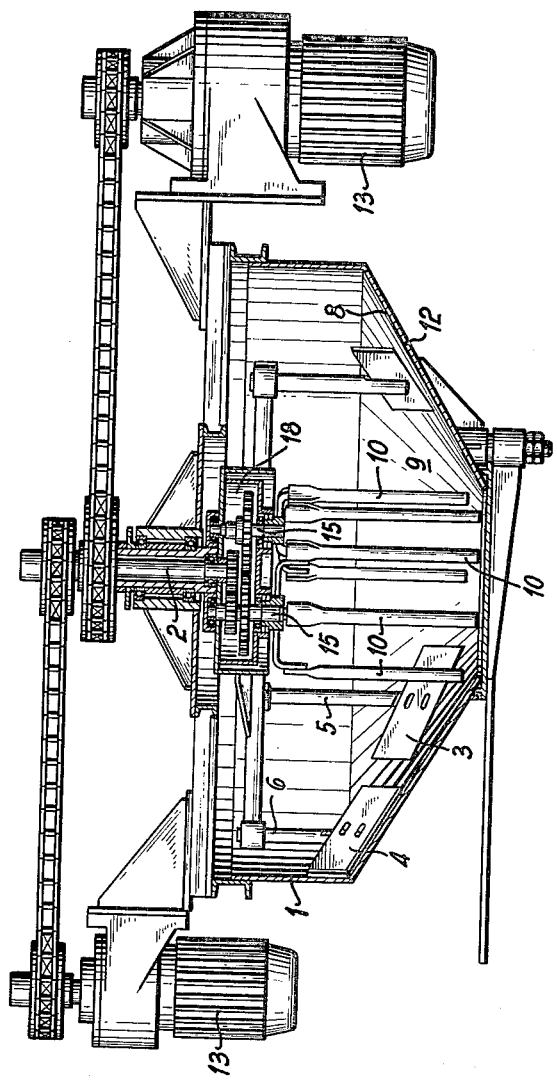

INVENTOR:
Manfred KINDLER

BY Robert H. Jacob.
AGT.

United States Patent Office 3,215,412
Patented Nov. 2, 1965

3,215,412
MIXING MACHINE
Manfred Kindler, Neustadt an der Weinstrasse, Germany, assignor to IBAG Internationale Baumaschinenfabrik Aktiengesellschaft, Neustadt an der Weinstrasse, Germany
Filed July 29, 1964, Ser. No. 385,869
Claims priority, application Germany, July 30, 1963,
J 24,155
5 Claims. (Cl. 259—179)

The present invention relates to mixers, particularly mixing machines of the type that are utilized for mixing the components of concrete or bituminous construction materials.

In a special embodiment of this type of machine a stationary circular drum having a flat base plane is provided in which the mixing tools rotate about a vertical center axis. In a different arrangement of the mixing tools they do not rotate about the center axis of the mixing drum but about an axis which is parallel thereto. Furthermore, the axis of rotation of the mixing tools proper may circulate about the vertical center axis. With such embodiments of the mixing tools, it was obviously intended to obtain more intimate mixing of the individual mixture components. For emptying it is possible to remove a part of the bottom of the mixing trough. The mixing tools then must always be arranged in such a manner that they transport the entire contents of the drum to the discharge aperture thus formed.

It is an object of the present invention to further improve mixing machines of the type referred to above in order to obtain greater mixing intensity and to shorten the discharge time.

In accordance with the invention this object is accomplished with a mixing machine where the bottom of the mixing drum extends conically from the upper exterior downwardly and inwardly toward a circular, plane, centrally arranged discharge opening. Furthermore, the mixing arms rotating about the center axis are provided with mixing tools which circulate above the outer conical portion of the bottom of the mixing trough, while in the inner space the discharge opening mixing tools are provided which rotate about the vertical center axis in the opposite direction.

The mixing tools may be arranged in such a manner that they attain an optical mixing intensity while they are relieved of the feeding toward the discharge opening. The discharging of the trough is effected by gravitational force. A further improvement of the mixing intensity is obtained by the fact that now a possibility is provided centrally of the mixing drum of pre-mixing in a narrow space the finest particles and the liquid that has to be added.

In accordance with a further object of the invention the mixing tools which sweep the inner space can, besides rotating about the vertical axis of the mixing machine, effect a further rotation about their own center axis which is likewise vertical or solely about the same.

The scoop-like mixing tools or blades that sweep over the inclined outer range of the mixing drum can be displaced with respect to one another in radial direction. The arrangement of the mixing arms need not be symmetrical with respect to the vertical center axis of the mixing machine, but rather the mixing arms may, depending on their form of construction, extend outwardly from the vertical center axis in a supporting differing angular disposition relative to one another.

For varying the mixing effect it is furthermore possible to provide means for operating the mixing machine at different mixing velocities of the mixing tools.

Depending on the local conditions, the drive motor may be arranged at the top vertically of the center axis or also laterally.

Figure 2:
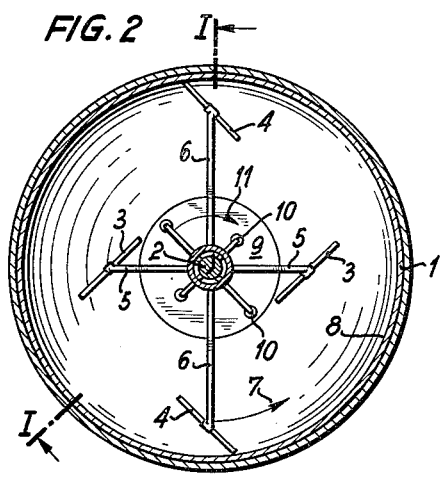
Figure 3:
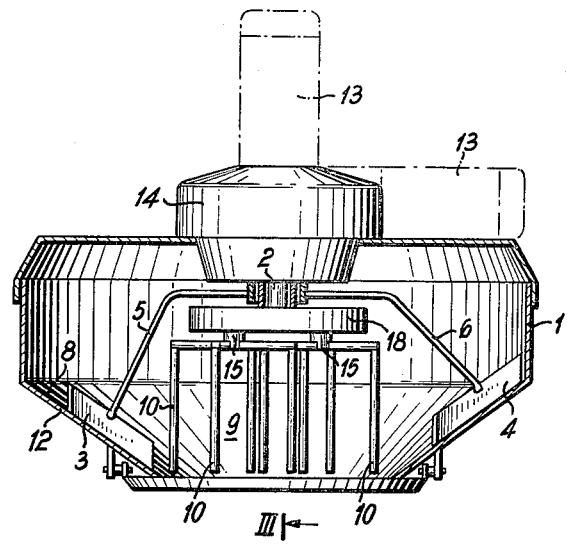
Figure 4:
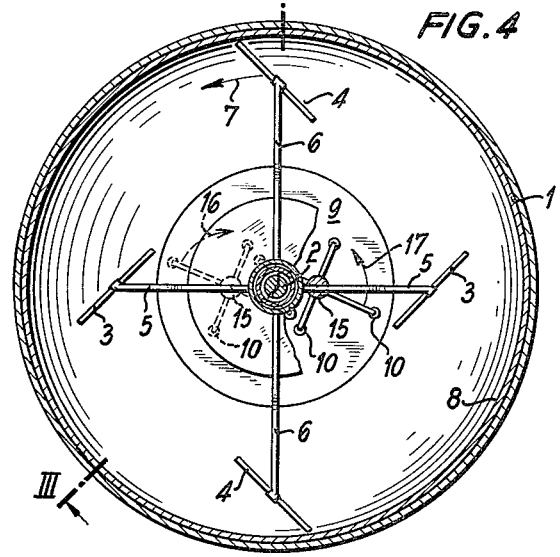
Figure 5:
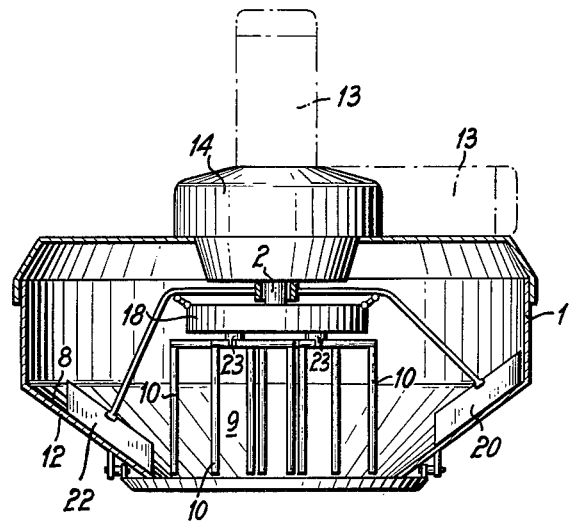
Figure 6:
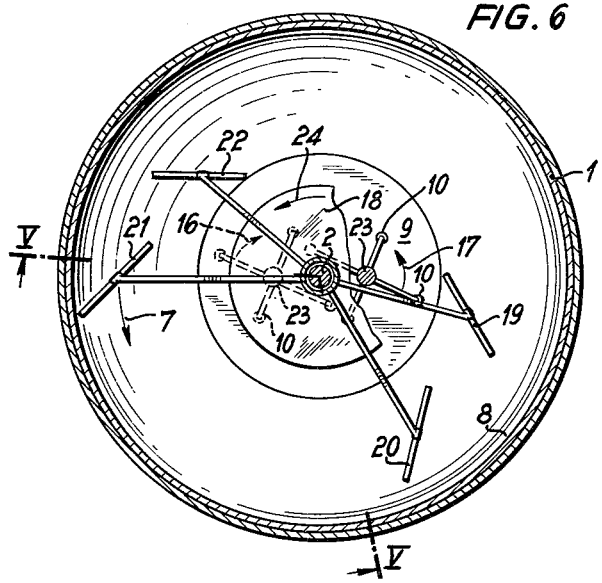

Further objects and advantages of the invention will become apparent from the following specification with reference to the embodiments of the inventive concept illustrated schematically in the appended drawings, in which FIG. 1 is a simple embodiment showing the mixer in accordance with the invention schematically in a vertical cross-section, FIG. 1a is a section taken along line I—I in FIG. 2, FIG. 2 is the same mixer showing a horizontal section through the plane of the mixing tools, FIG. 3 is a further embodiment showing the mixer in accordance with the invention, again in a vertical section, FIG. 3a is a section taken along line III—III in FIG. 4, FIG. 4 is a horizontal section of the embodiment in accordance with FIG. 3, FIG. 5 shows a third embodiment in vertical section, and FIG. 6 is a horizontal section through the embodiment in accordance with FIG. 5.

In a mixing drum 1 having a circular base plane, mixing tools 3 and 4 in the form of mixing blades rotating about a vertical mixer axis or shaft 2 are secured to the ends of mixing arms 5 and 6. These mixing tools 3 and 4 which effect only a simple rotary movement move in the direction of the arrow 7 and are disposed in inclined position and sweep over the outer area 8 of the mixing drum which is inwardly inclined.

In the inner area 9 of the mixing drum 1, the bottom of which is also the discharge opening, two further mixing tools 10 in the form of vertical rods rotate and, as indicated by the arrow 11, in the direction opposite to the direction of rotation of the mixing tools 3, 4.

To support the mixing effect of the mixing tools the bottom surface 12 of the mixing drum 1 is inclined obliquely inwardly. Furthermore, the mixing tools or blades 3 and 4 and the rods 10 are displaced relative to one another in a radial direction.

As indicated in FIG. 1, a drive motor 13 may be arranged either vertically above the mixing shaft 2 or laterally of the upper end thereof. A suitable transmission 14 is connected between the drive 13 of the mixing tools 3, 4 and 10.

FIGS. 3 and 4 illustrate a further embodiment where the mixing tools or blades that sweep over the outer area 8 correspond to the arrangement of the mixing tools in the embodiment of FIGS. 1 and 2. The mixing tools which sweep over the inner space 9, however, have their axes of rotation displaced from the center line of the mixing drum outwardly and rotate about their own vertical axes 15 effecting rotary movements in the direction of the arrows 16 and 17. For facilitating these rotary movements a special transmission 18 is interposed.

A further possibility for variation is provided as shown in FIGS. 5 and 6 to arrange the mixing arms of the mixing tools which sweep the outer area 8 of the mixing drum 1 non-symmetrically with respect to the vertical center axis, but to select particular mutually supporting angular positions in accordance with the shape of the mixing tools for their effectiveness.

Thus in particular it can be seen in FIG. 6 that, for example, one mixing scoop 19 is followed at a smaller angular distance by a mixing scoop 20 displaced outwardly. Approximately opposite to these, two further mixing scoops 21 and 22 are provided, where the outer scoop is first, followed again at a smaller angular distance by a scoop that is inwardly displaced. The setting of the scoops is such that the scoops 19 and 20 move the mix outwardly, while the scoops 21 and 22 draw the mix inwardly. All scoops rotate in the direction of the arrow 7.

The inner space of the mixing drum 1 is here also swept over by two mixing tools rotating about vertical axes of rotation 23 which are displaced outwardly from the center line but which in this embodiment participate in a further rotary movement about the center axis in the direction of the arrow 24.

Having now described my invention with reference to the embodiments illustrated in the drawings, I do not wish to be limited thereto, but what I desire to protect by Letters Patent of the United States is set forth in the appended claims.

I claim:

1. A mixing machine for concrete or the like comprising a stationary drum and mixing tools adapted to rotate about the vertical center axis of the machine, said drum having a bottom portion and a circular upper wall, said bottom portion having a frusto conical surface portion extending from the upper exterior at the lower end of said wall inwardly and downwardly and defining a central circular discharge aperture, and a horizontal unobstructed bottom portion of generally circular form defining a closure for said discharge aperture, and said mixing tools comprising a plurality of outer members such as blades having scraping edges supported with said edges following the angle of inclination of said conical surface for rotation about the center axis in one direction to sweep over said conical surface portion, and a plurality of inner mixing elements in the form of vertical rods disposed at different distances from said center axis, supported for rotation about the center axis in the opposite direction to sweep over said horizontal bottom portion.

2. A mixing machine for concrete or the like comprising a stationary drum and mixing tools adapted to rotate about the vertical center axis of the machine, said drum having a bottom portion and a circular upper wall, said bottom portion having a frusto conical surface portion extending from the upper exterior at the lower end of said wall inwardly and downwardly and defining a central circular discharge aperture, and a horizontal unobstructed bottom portion of generally circular form defining a closure for said discharge aperture, and said mixing tools comprising a plurality of outer members such as blades having scraping edges supported with said edges following the angle of inclination of said conical surface, for rotation about the center axis in one direction to sweep over said conical surface portion, and a plurality of inner mixing elements in the form of vertical rods disposed at different distances from said center axis, supported for rotation about the center axis in the opposite direction to sweep over said horizontal bottom portion, and outer axes supported parallel to said center axis supporting said mixing elements for effecting a rotation about an axis disposed parallel to said center axis.

3. A mixing machine for concrete or the like comprising a stationary drum and mixing tools adapted to rotate about the vertical center axis of the machine, said drum having a bottom portion and a circular upper wall, said bottom portion having a frusto conical surface portion extending from the upper exterior at the lower end of said wall inwardly and downwardly and defining a central circular discharge aperture, and a horizontal unobstructed bottom portion of generally circular form defining a closure for said discharge aperture, and said mixing tools comprising a plurality of outer members such as blades having scraping edges supported with said edges following the angle of inclination of said conical surface, for rotation about the center axis in one direction to sweep over said conical surface portion, and a plurality of inner mixing elements in the form of vertical rods disposed at different distances from said center axis, supported for rotation about the center axis in the opposite direction to sweep over said horizontal bottom, and outer axes supported parallel to said center axis supporting said mixing elements for effecting a rotation about an axis disposed parallel to said center axis, said outer axes being rotatable about said center axis.

4. A mixing machine for concrete or the like comprising a stationary drum and mixing tools adapted to rotate about the vertical center axis of the machine, said drum having a bottom portion and a circular upper wall, said bottom portion having a frusto conical surface portion extending from the upper exterior at the lower end of said wall inwardly and downwardly and defining a central circular discharge aperture, and a horizontal unobstructed bottom portion of generally circular form defining a closure for said discharge aperture, and said mixing tools comprising a plurality of outer members such as blades having scraping edges supported with said edges following the angle of inclination of said conical surface, for rotation about the center axis in one direction to sweep over said conical surface portion, and a plurality of inner mixing elements in the form of vertical rods disposed at different distances from said center axis, supported for rotation about the center axis in the opposite direction to sweep over said horizontal bottom portion, outer axes supported parallel to said center axis supporting said mixing elements for effecting a rotation about an axis disposed parallel to said center axis, and said blades having arms supported by said center axis and extending nonsymmetrically in radial direction and at different angular positions relative to one another.

5. A mixing machine for concrete or the like comprising a stationary drum and mixing tools adapted to rotate about the vertical center axis of the machine, said drum having a bottom portion and a circular upper wall, said bottom portion having a frusto conical surface portion extending from the upper exterior at the lower end of said wall inwardly and downwardly and defining a central circular discharge aperture, and a horizontal unobstructed bottom portion of generally circular form defining a closure for said discharge aperture, and said mixing tools comprising a plurality of outer members such as blades having scraping edges supported with said edges following the angle of inclination of said conical surface, for rotation about the center axis in one direction to sweep over said conical surface portion, and a plurality of inner mixing elements in the form of vertical rods disposed at different distances from said center axis, supported for rotation about the center axis in the opposite direction to sweep over said horizontal bottom portion, said machine including drive means for said mixing tools provided with speed control means adapted to control the speed of said outer members and of said inner mixing elements independently of one another.

References Cited by the Examiner

UNITED STATES PATENTS 1,767,791    6/30    Gough et al. _____ 259—178

FOREIGN PATENTS 157,557    1/21    Great Britain.

WALTER A. SCHEEL, *Primary Examiner.*

CHARLES A. WILLMUTH, *Examiner.*